H. D. PERKY, DEC'D.
L. SPARKS, ADMINISTRATOR.
MACHINE FOR MANUFACTURING GRAIN INTO FORM FOR FOOD.
APPLICATION FILED MAR. 12, 1906.
916,365. Patented Mar. 23, 1909.
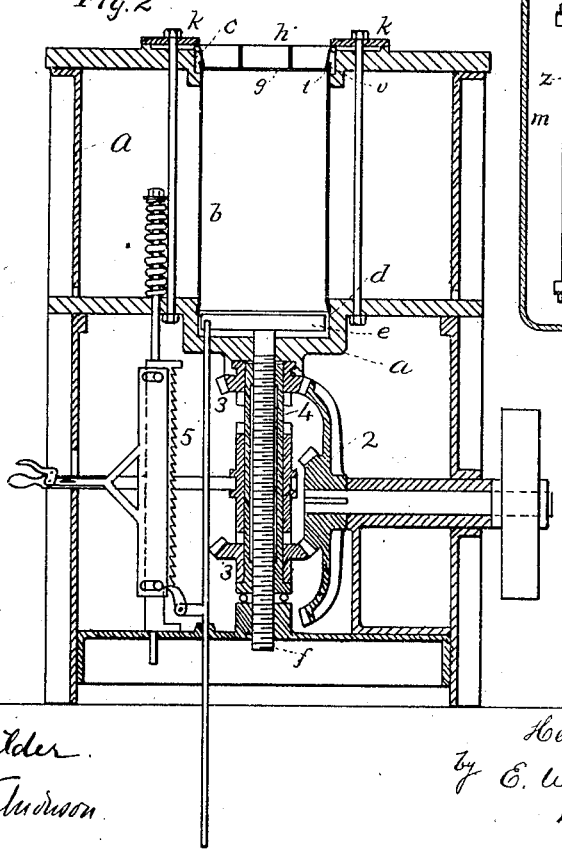

UNITED STATES PATENT OFFICE.

HENRY D. PERKY, OF GLENCOE, MARYLAND; LABAN SPARKS ADMINISTRATOR OF SAID HENRY D. PERKY, DECEASED.

MACHINE FOR MANUFACTURING GRAIN INTO FORM FOR FOOD.

No. 916,365.	Specification of Letters Patent.	Patented March 23, 1909.

Application filed March 12, 1906. Serial No. 305,715.

*To all whom it may concern:*

Be it known that I, HENRY D. PERKY, a citizen of the United States, and resident of Glencoe, in the county of Baltimore and State of Maryland, have made a certain new and useful Invention in Machines for Manufacturing Grain into Form for Food; and I declare the following to be a full, clear, and exact description of the same, such as will enable others skilled in the art to which it appertains to make and use the invention, reference being had to the accompanying drawings, and to letters or figures of reference marked thereon, which form a part of this specification.

Figure 1 is a top view of the machine. Fig. 2 is a vertical sectional view. Fig. 3 is a plan view of perforated pan. Fig. 4 is a sectional view of the same. Fig. 5 is a sectional view of a boiler showing the cooking cylinder. Fig. 6 is a top view of the cylinder.

The object of the invention is to provide means mainly for reducing grain, and especially corn, to short, uniform lengths of attenuated shape and rough exterior, separate from each other, and so prepared as to furnish a thoroughly cooked, tender and agreeable breakfast food.

In preparations of corn it is believed that it is seldom sufficiently cooked or so worked in the manufacture as to render it tender and without undue asperity. By the means hereinafter described, it is designed to produce an agreeable article of food from grain in manufactured form and ready for use.

In the accompanying drawings, illustrating the invention, the letter *a*, designates a press; *b*, a cylindric or prismatic press casing or receptacle open at both ends, which is designed to be placed in the seat *d*, of the press, and is removable therefrom. In axial line with the seat *d*, is the follower *e*, of the press, which is designed to be operated by means of a screw *f*, or other competent power device. As shown, the follower is below the seat *d*, and so arranged that the cylinder *b*, can be readily placed in said seat. Axially, above the cylinder *b*, is located a perforated plate *g*, having thin edge perforations, or of thin material, such as sheet tin, this plate being removable. As shown, the plate *g*, forms the bottom of a removable pan *h*, which is secured in position in the press, by means of clamps or buttons *k*, connected to the press frame. The plate is designed to be held in close contact with the upper edge of the cylinder *b*, and the opening ledge *c*, of the frame is in close relation thereto. A close joint is designed to be formed, usually, by providing the pan with a slight annular bevel seat, as at *t*, to engage a beveled edge *v*, of the cylinder or casing *b*.

At *m*, is indicated a boiler which is of sufficient size to contain the cylinder *b*, together with enough water for the boiling which requires several hours, varying a little because of the amount and character of the grain, which may be maize of the white, yellow or red variety, deprived of its outer hull or coat, and in ground form. Or steam may be used instead of boiling water for the cooking.

The cylinder *b*, is provided with heads or caps *n*, having inner circular seats *p*, designed to engage the edges of the cylinder wall in an air-tight manner, and so as to prevent the entrance of water from the boiler. The reduced or ground grain having been thoroughly mixed with about an equal quantity of water is employed to fill the cylinder, which is then tightly closed by means of its caps and suitable clamp bolts *z*, which are arranged to be readily removable from the notch bearings *s*, of the caps. These heads or caps are preferably made of circular periphery in order to facilitate a rolling movement from place to place. I have found that the material is usually completely cooked in about seven hours, and, as in the cooking, the cylinder is not allowed to come in contact with the wall or bottom of the boiler, the effect will be uniform or nearly so throughout the charge. The cylinder, having been removed from the boiler, is laid aside for cooling. Then, its heads having been removed, it is placed in the press, and clamped to the perforated plate or wire cloth. The follower having been put in operation, the particles of material in the cylinder are caused to move about and commingle in its upper portion to pass through the perforations of the plate in the form of shoots or sprays having an upright or approximately vertical position, which they are designed to maintain. To this end their length is limited by the consistence of the cooked material, and is designed to be uniform. With this object in view, the gearing for operating the follower screw is arranged for intermittent action, and may consist of a reversing driving gear wheel 2, adapted to engage either bevel pinion 3, of an adjustable double gear sleeve nut 4, under control of an automatic shifting device 5. In this device, a shifting arm loosely engages a reciprocating clutch sleeve on the sleeve nut 4, and to said arm is connected a toothed plate in engagement with a rod attached to the follower, said engagement being effected by means of a pawl pivoted to said rod. To the toothed plate is connected a sliding disengaging plate which is connected to the handle of the shifting arm by an angle lever handle, which operates to cause the disengaging plate to push the pawl out of engagement with the toothed plate. Each tooth of the toothed plate is designed to be of proper length for a single operation of the follower, at the end of which the rise of the clutch sleeve causes disengagement of the latter from the lower pinion 3, and stops the movement of the follower. The pawl being then disengaged from the front tooth of the toothed plate becomes engaged with the second tooth, as the plate drops to first position, and the movement is repeated. When the pawl arrives at the end of its upward movement the sleeve clutch can be engaged with the upper pinion 3, the movement of which will rapidly reverse the movement of the sleeve nut and cause the follower to quickly descend to its lowest position. Through these devices, the driving gear is designed to operate, to slowly raise the follower, to rapidly reverse it, and to become disengaged in an intermittent manner to stop the movement. When the sprays have been formed on the plate to proper length so that they will maintain their upright position, the pan is charged. Its clamps can then be loosed, thereby cutting off or terminating the sprays which adhere to the perforated plate by their ends. The pan with its charge of sprays is then removed to a charging oven, or may be placed in a rack with other similarly charged pans, such rack being when filled, placed in a drying chamber. In order that the mixing motion of the material in the upper part of the press cylinder shall be more pronounced, it is preferred to make the perforated bottom of the pan of less diameter than the cylinder. Because of the approximately vertical and separated position of the sprays on the drying pan, the hot air of the drier has ready access to them individually, so that they are dried in a rapid and uniform manner. The finished product is readily discharged from the pan by the movement of a rubber or scraper in contact with its bottom. This product consists of separate sprays or elongated forms designed to be of uniform length and thickness, having rough exterior, porous and granular structure and crisp and tender quality. They may be white, or yellow, or other color, according to the variety of grain employed in the manufacture. Or varieties may be used, and the product mixed, which will equalize the constituent elements of the resultant preparation, besides giving it a bright appearance of white and yellow or other color.

Having described the invention, what I claim and desire to secure by Letters Patent is—

1. In a machine for reducing grain to elongated forms or sprays of uniform and limited length, the combination with a press, of a removable perforated forming and cut-off carrier plate, a removable open-end press casing, and clamping devices.

2. A machine for reducing grain to elongated forms or sprays of uniform length consisting of a press, a removable perforated forming and cut-off plate, a removable open-end press casing and intermittently operating and quick reversing gear.

In testimony whereof I affix my signature, in presence of two witnesses.

HENRY D. PERKY.

Witnesses:
WM. C. BREED,
L. S. BURBANK.